Oct. 24, 1950     C. W. WALLHAUSEN     2,527,043
OPTICAL INSTRUMENT ILLUMINATION DEVICE
Original Filed May 4, 1946     2 Sheets-Sheet 1
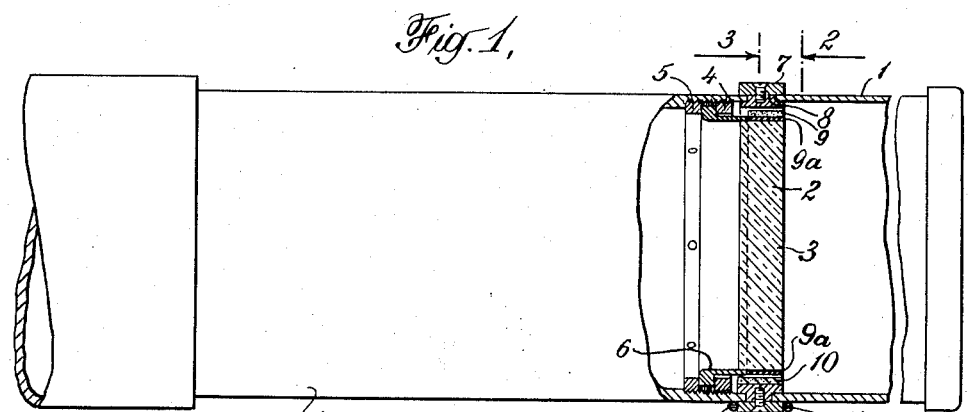
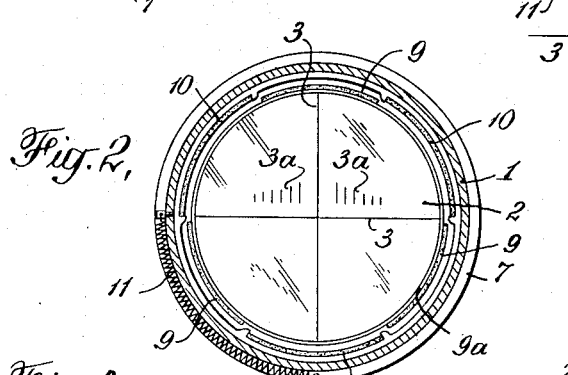
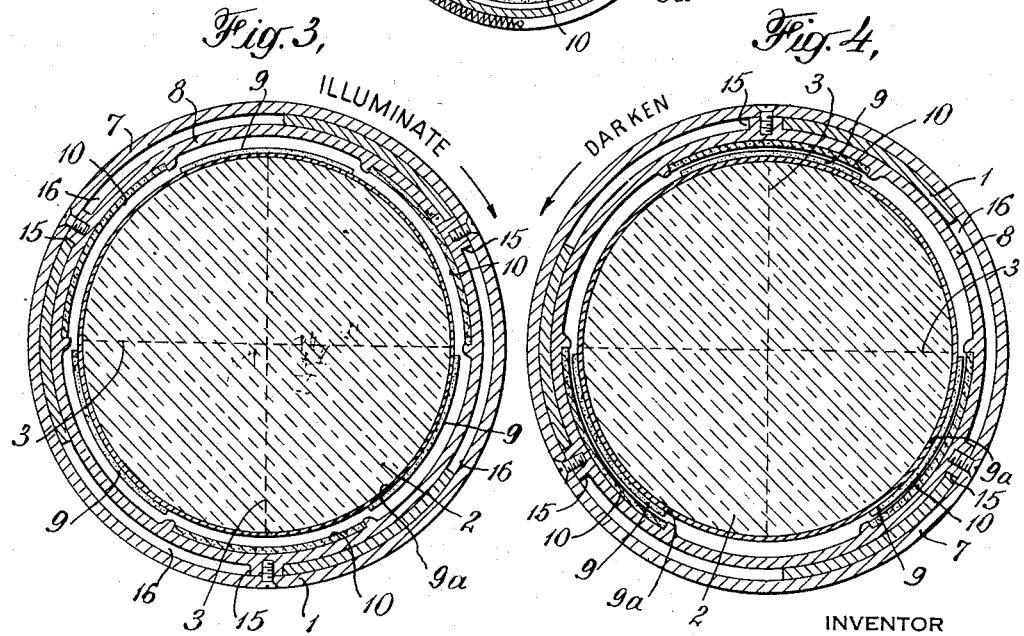
INVENTOR
CLARENCE W. WALLHAUSEN
BY
Pennie, Edmonds, Morton & Barrows
ATTORNEYS Oct. 24, 1950     C. W. WALLHAUSEN     2,527,043
OPTICAL INSTRUMENT ILLUMINATION DEVICE
Original Filed May 4, 1946     2 Sheets-Sheet 2
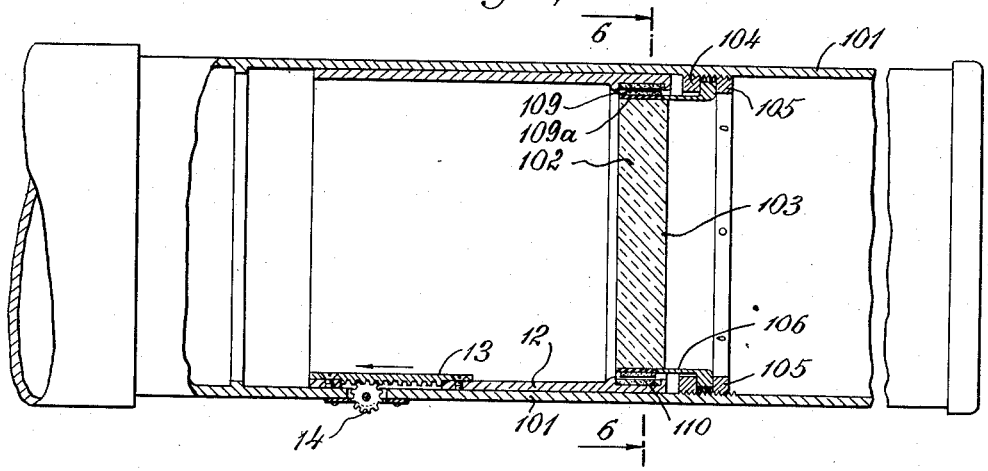
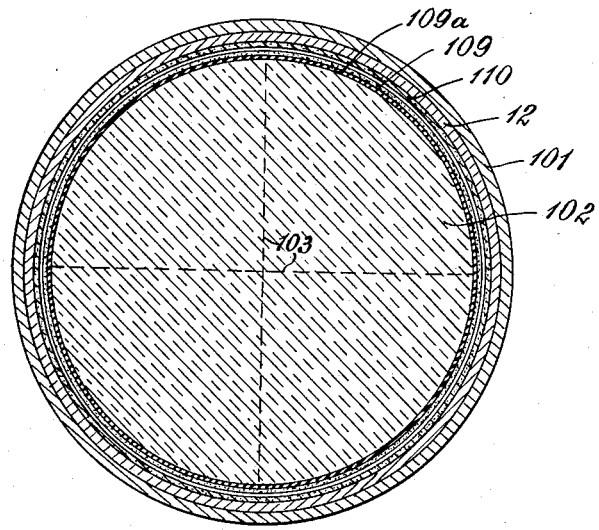
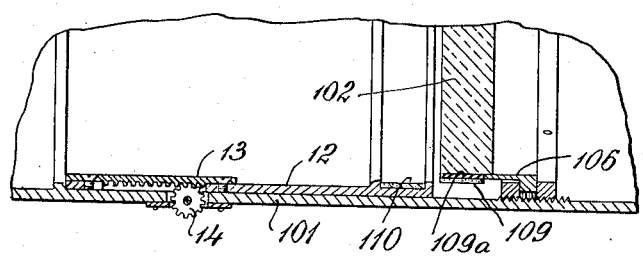
INVENTOR
CLARENCE W. WALLHAUSEN
BY
Pennie, Edmonds, Morton & Barrows.
ATTORNEYS Patented Oct. 24, 1950

2,527,043

UNITED STATES PATENT OFFICE 2,527,043

OPTICAL INSTRUMENT ILLUMINATION DEVICE

Clarence W. Wallhausen, Morristown, N. J., assignor to United States Radium Corporation, New York, N. Y., a corporation of Delaware Original application May 4, 1946, Serial No. 667,436, now Patent No. 2,476,340, dated July 19, 1949. Divided and this application April 16, 1949, Serial No. 87,883

9 Claims. (Cl. 250—77)

This invention relates to the illumination of optical instruments and especially to the lighting of reticles.

In brief, the invention comprises a device for illuminating the reticle of an optical instrument comprising a band of thin, translucent material proportioned to fit the periphery of a reticle, a layer of non-radioactive phosphor disposed on said material in such position that light emanating from said phosphor is transmitted through and beyond said material, and means for supporting a radioactive substance in activating juxtaposition with said phosphor.

This application is a division of my copending application for U. S. Letters Patent Serial No. 667,436, filed May 4, 1946, granted July 19, 1949, as Patent No. 2,476,340.

Many types of optical instruments such as telescopes, range finders, transits and periscopes, include a reticle (or reticule) which may comprise, for example, a glass disc having two plane surfaces, on one of which are engraved cross hairs or calibration marks. In using the instrument, it is necessary to see the marks or indicia (hereinafter called cross hairs) under widely differing light conditions. For instance, a range finder or a periscope for modern use must be employed in brilliant daylight when subject to considerable reflection from the water, at night in substantially total darkness, and in all degrees of intermediate light conditions. Under some of these conditions the cross hairs are satisfactorily visible without artificial illumination, but under other conditions, notably during twilight, the cross hairs are very difficult or impossible to see.

To alleviate these disadvantages, four principal proposals have been made. First, the reticle has been edge-lighted by small electric lamps, second, the cross hairs or indicia themselves have comprised either a self-luminous paint, or, third, a phosphorescent substance which would glow when activated by an ultra-violet lamp placed at one side of the reticle, and, fourth, the reticle has been edge-lighted by coating the peripheral surface thereof with self-luminous paint.

All of these proposals, while to some extent effective in causing the cross hairs or other indicia to be visible, have introduced new disadvantages which have made them impracticable for many purposes.

The first and third proposals include electric lamps, batteries or other sources of power, and electric wiring and controls. Especially in small optical instruments, such additional equipment cannot be accommodated, and furthermore, it adds many extra components subject to breakdown, in addition to the difficult requirement for reliable electric power. The second and fourth proposals, which comprise the use of a self-luminous paint, are in some respects an improvement over the first and third proposals, but these arrangements provide a continuous non-adjustable illumination especially troublesome under twilight conditions which require a close adjustment of the degree of illumination to afford satisfactory operation. However, the more serious disadvantage results from the fact that self-luminous paints, which comprise a phosphor activated with a radioactive material intermixed therewith, must be caused to glow at a high intensity in order to provide sufficient light. To achieve this high degree of luminosity the phosphor must be activated at such a high rate that its useful life is very short. In most cases such life would not be more than one month, and in many cases not more than two weeks, after which a new reticle with a fresh coating must be substituted in the instrument, or the old reticle removed and a new coating applied to it. Neither of these practices is feasible in connection with marine or other remote uses, because, in the first case the spare reticles would deteriorate at the same rate as those in use, and the second case calls for laboratory techniques which are not ordinarily available at sea or other remote locations.

In accordance with the present invention, a luminescent but non-radioactive phosphor is applied to a thin, translucent, plastic band, strip, or ring, which may readily be applied to, or fitted around, the periphery of or otherwise to the reticle so as to permit of easy replacement. The radioactive material is, as described in my mentioned patent, not admixed with the phosphor, but comprises a separate element having an area which is positioned closely adjacent that of the phosphor, so that the radiations from this material may impinge on and activate the phosphor.

Preferably, the radioactive material is arranged to be movable with respect to the phosphor coating on the reticle so that the respective areas may be adjusted to overlap completely giving maximum illumination, or so as not to overlap at all giving zero illumination, or so as to overlap to any desired intermediate degree to provide a corresponding adjustment of the intensity of illumination. Thus the active life of the phosphor is greatly increased because the phosphor deteriorates only during actual use, viz., while being subjected to bombardment by activating radiations.

A better understanding of the invention may be had from the following description considered together with the drawings, of which:

Fig. 1 illustrates the eye-piece of an optical instrument, such as a telescope, the portions pertinent to the present invention being shown in vertical cross-section;

Fig. 2 represents a cross-sectional view along the line 2—2 of Fig. 1 looking in the direction of the arrows;

Fig. 3 is a cross-sectional view taken along the line 3—3 of Fig. 1, looking in the direction of the arrows, the illuminating members being in the positions providing minimum illumination;

Fig. 4 is a cross-sectional view similar to that of Fig. 3, but differing therefrom in that the illuminating members are shown in the positions providing maximum illumination;

Fig. 5 illustrates an eye-piece, generally similar to that of Fig. 1, but in which the adjustable features comprise an alternative embodiment;

Fig. 6 is a vertical cross-sectional view taken along the line 6—6 of Fig. 5, looking in the direction of the arrows; and Fig. 7 is a fragmentary view corresponding to a portion of Fig. 5, but with the movable elements adjusted to provide minimum illumination, whereas Fig. 5 illustrates the same elements in position to provide maximum illumination.

Figs. 1, 2 and 3 show an eye-piece tube 1 in which a glass reticle 2 is concentrically mounted by a gripping ring 6. This ring is held in place on the inside of the tube 1 by a threaded inner retaining ring 4 against which the spring ring 6 is pressed by a threaded outer retaining ring 5. The reticle 2 carries cross hairs 3, or additional indicia marks 3a (Fig. 2) which it is desired to illuminate. The nature of the indicia may differ in different instruments.

Around the periphery of reticle 2 is fitted a thin band or ring 9a of translucent material, such as a suitable plastic, which is coated on the exterior surface with a non-radioactive luminescent phosphor material 9. The phosphor area or areas should be so positioned on one surface of the band that light emanating from the phosphor is transmitted through the material of the band and out the other side thereof, wherefrom it may pass to the reticle. If this band is in the form of a closed ring and the inside diameter thereof is such as to fit snugly around the periphery of the reticle it may be slid on to the same and retained there by normal friction. Alternatively, the coating may be applied to a flat or curved open band of suitable material which may be secured around the periphery of or otherwise to the reticle by any appropriate means, such as cement. Thus, this phosphor-coated band comprises a discrete article separable from the reticle and therefore readily replaceable.

Various luminous phosphor materials are suitable for the purposes herein described and it is usually desirable to select a phosphor which is best adapted to the conditions under which the particular instrument is to be used. For example, a phosphor comprising zinc sulphide provides a yellowish green light which is desirable under many circumstances because of its high brilliancy, and on the other hand a phosphor comprising cadmium silicate provides a less brilliant and orange light which is sometimes desirable. A phosphor comprising cadmium tungstate provides a pale blue light. Suitable mixtures of these or other phosphors are sometimes useful. The area or areas of phosphor should be applied in a thin coating so that the luminous particles thereof will not be masked by other particles. It will now be apparent that the present invention permits of several such coated strips or rings being kept on hand so that the desired one may be selected and employed under any given conditions.

From the discussion above it will be recalled that the radioactive material is, in accordance with my mentioned invention, mounted separately from the phosphor, in order (1) to increase the life of the phosphor by subjecting it to activating radiations only when illumination is required, and (2) to provide adjustability of the intensity of illumination. Hence, a suitable radioactive material 10 is affixed to a rotating ring having an inner section 8 and an outer section 7, the radioactive material being suitably secured to the inner section 8. The inner and outer sections are fastened together at three equi-distant points where the inner ring carries a post portion 15 which extends through a suitable slot in the tube 1. There being three such post portions, three corresponding slots 16 in the tube 1 are required.

As shown more clearly in Figs. 2, 3 and 4, the periphery of the reticle 2 carries three phosphor areas 9 equidistantly spaced therearound by non-coated areas. Three corresponding areas of radioactive material 10 are provided on the inside surface of the inner ring section 8. Of course, as many coacting areas as desired may be employed. When the ring 7, 8 is turned so that the areas 9 and 10 do not overlap, as shown in Figs. 2 and 3, substantially no activating radiations from radioactive surfaces 10 will impinge upon the surfaces of the phosphor areas 9, with the result that the phosphor areas 9 will not glow and hence their active life will be maintained indefinitely. On the other hand, when the ring is turned to the right (in Fig. 3, in the direction of the arrow labeled "Illuminate") the areas 9 and 10 will be caused to overlap progressively until they overlap completely as shown in Fig. 4. In this manner the intensity of illumination can be adjusted from substantially zero to maximum. The mechanism should preferably be constructed to provide very close spacing between the areas 9 and 10 when in the position of Fig. 4.

Although in accordance with the invention any radioactive material suitable to activate a desired phosphor may be employed for the purpose, I prefer to utilize radioactive foil of the types described in U. S. Patent No. 2,326,631 to Fischer, and in U. S. Letters Patent No. 2,479,882, granted August 23, 1949 to me jointly with Harry H. Dooley and Clayton C. Carroll. The useful life of such radioactive foil is longer than the expected life of the instrument.

The rotating ring 7, 8 may be arranged as above described for manual movement in either direction, there being sufficient friction between the ring members 7 and 8 and the tube 1 to hold the ring in any desired position. However, in some types of optical instruments it is expedient to attach one or more springs to the rotating ring so that when the ring is manually moved toward the position shown in Fig. 4 it will, when released, be automatically returned by the action of the springs to the position shown in Fig. 3. For this purpose two springs 11 (Figs. 1 and 2) may be positioned along the two edges of the outer section 7 of the rotating ring against the outside of tube 1. One end of each spring is attached to the ring 7 and the other end is attached to the tube 1, so that when the ring section 7 is manually rotated the spring is stretched. Upon manual release of the ring section 7, the springs will automatically rotate the ring to the position shown in Fig. 3.

The alternative form of the invention disclosed in Figs. 5, 6 and 7 provides substantially the same results as those obtained from the embodiment above described, but employs a different mechanical arrangement. In illustrating the present embodiment the components which correspond functionally to those shown in Figs. 1-4, inclusive, have been given the same reference numbers, plus 100. This embodiment will, therefore, be described chiefly for the purpose of pointing out the features wherein it differs from the embodiment first described.

In Fig. 5 the reticle 102 carries a coating 109 of phosphor applied to a band 109a of translucent material, as before described. In this case, however, it is feasible to employ a continuous band of phosphor 109 around the periphery of the reticle by applying the phosphor in a continuous area around the surfaces of the translucent band 109a, as shown more clearly in Fig. 6.

Instead of being supported on a rotating ring the radioactive material 10 is in this embodiment supported on a tubular sliding sleeve 12. This area of radioactive material may be in the form of a continuous band corresponding to that of phosphor 109. A rack 13 fitted to sleeve 12 coacts with pinion 14 so that when pinion 14 is turned in one direction or the other the sleeve 12 will slide within the eye-piece tube 101. As shown in Fig. 5, one extreme position of sleeve 12 results in a substantially complete overlapping of areas 109 and 110, whereas when the sleeve 12 is moved to the other extreme position, as shown in Fig. 7, the areas 109 and 110 do not overlap at all. By this means the illumination of the reticle can be adjusted from maximum to substantially zero illumination, and likewise permits adjustment to all intermediate degrees of intensity of illumination. Two advantages of the embodiment of Figs. 5-7 are that it permits a greater area of glowing phosphor to be used on a given area of the edge of a reticle and, therefore, a greater degree of illumination is possible, and that the illumination is evenly distributed over the entire area of the edge of the reticle. However, it has been found that for most purposes the degree of illumination and the degree of its uniformity provided by the embodiment first described are sufficient.

Instead of moving the area of radioactive material by sliding sleeve 12 (Fig. 6) that material may be affixed to the inner surface of tube 101, so as to overlap or overlie the phosphor area. Then, if the end of sleeve 12 is shaped to slide between the two areas, in one extreme position it will completely screen the activating radiations from the phosphor surface, and in the other extreme position will not screen any of the radiations. Intermediate positions will provide any other desired change in the amount of radiations which impinge on the phosphor surface.

I claim:

1. A device for illuminating the reticle of an optical instrument, comprising a circular band of thin translucent material, a coating of non-radioactive phosphor on an exterior area of said material such that light emanating from said phosphor is transmitted inwardly through said material, said band having an inside diameter such as to fit snugly around the periphery of a reticle and to be adapted to be secured to and removed from said reticle, and means for supporting a radioactive non-luminous substance in activating juxtaposition with said coating.

2. A device for illuminating the reticle of an optical instrument, comprising a strip of translucent material, a coating of non-radioactive phosphor on an area of said material, said strip being of width and length suitable to be secured to the periphery of a reticle, and means for supporting a radioactive non-luminous substance in activating juxtaposition with said coating.

3. A device for illuminating the reticle of an optical instrument comprising a band of thin, translucent material proportioned to fit the periphery of a reticle, a coating of non-radioactive phosphor affixed on one surface of said material in such position that light emanating from said phosphor is transmitted through and beyond said material, and means for supporting a radioactive non-luminous substance in activating juxtaposition with said coating.

4. A device for illuminating the reticle of an optical instrument comprising a band of thin, translucent material proportioned to fit the periphery of a reticle, and having at least two surfaces, a coating of non-radioactive phosphor affixed on one surface of said material such that light emanating from said phosphor is transmitted through said material and out the other surface thereof, and means for supporting a radio-active non-luminous substance in activating juxtaposition with said coating.

5. A device for illuminating the reticle of an optical instrument comprising a continuous band of thin, translucent material proportioned to fit the periphery of a reticle, a plurality of coated areas of non-radio-active phosphor affixed on said band, said areas being spaced apart by non-coated areas along said band in such positions that light emanating from each of said phosphor areas is transmitted through and beyond said material, and means for supporting a radioactive non-luminous substance in activating juxtaposition with said coating.

6. A device for illuminating the reticle of an optical instrument comprising a circular band of thin, translucent material proportioned to fit the periphery of a reticle and having an outer surface and an inner surface, a plurality of coated areas of non-radio-active phosphor affixed on the outer surface of said band, said areas being spaced apart by non-coated areas around said band, such that light emanating from each of said phosphor areas is transmitted inwardly through said material and out through the inner surface thereof, and means for supporting a radio-active non-luminous substance in activating juxtaposition with said coating.

7. A device for illuminating the reticle of an optical instrument comprising a band of thin, translucent material proportioned to fit the periphery of a reticle, a plurality of coated areas of non-radio-active phosphor affixed on said band substantially on one side thereof, said areas being spaced apart by non-coated areas along said band and being so positioned that light emanating from each of said phosphor areas is transmitted inwardly through said material and outwardly from the other side thereof, and means for supporting a radio-active non-luminous substance in activating juxtaposition with said coating.

8. A device for illuminating the reticle of an optical instrument comprising a band of thin, translucent material proportioned to fit the periphery of a reticle, a layer of non-radioactive phosphor disposed on said material in such position that light emanating from said phosphor is transmitted through and beyond said material, and means for supporting a radioactive substance in activating juxtaposition with said phosphor.

9. A device for illuminating the reticle of an optical instrument comprising a continuous band of thin, translucent material proportioned to fit the periphery of a reticle, a plurality of discrete areas of non-radioactive phosphor disposed on said band, said areas being spaced apart along said band in such positions that light emanating from each of said phosphor areas is transmitted through and beyond said material, and means for supporting a radioactive substance in activating juxtaposition with each of said phosphor areas.

CLARENCE W. WALLHAUSEN.

REFERENCES CITED

The following references are of record in the file of this patent:

UNITED STATES PATENTS

| Number | Name | Date |
| --- | --- | --- |
| 863,287 | Kunz | Aug. 13, 1907 |
| 1,150,118 | Hewitt | Aug. 17, 1915 |
| 1,269,636 | Norring et al. | June 18, 1918 |
| 1,302,353 | Friedrich | Apr. 29, 1919 |
| 1,529,643 | Fenderl | Mar. 10, 1925 |
| 2,140,269 | Pelkus et al. | Dec. 13, 1938 |
| 2,356,267 | Pelunis | Aug. 22, 1944 |
| 2,403,316 | Wallhausen | July 2, 1946 |
| 2,476,340 | Wallhausen | July 19, 1949 |